Oct. 4, 1966

A. S. BUROV ETAL 3,276,305

FLYING SHEARS FOR CUTTING ROLLED BENT AND SIMILAR ROLLED SHAPES

Filed Nov. 19, 1964

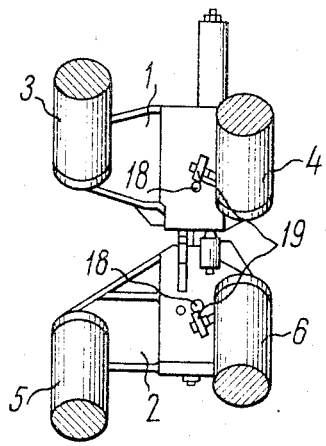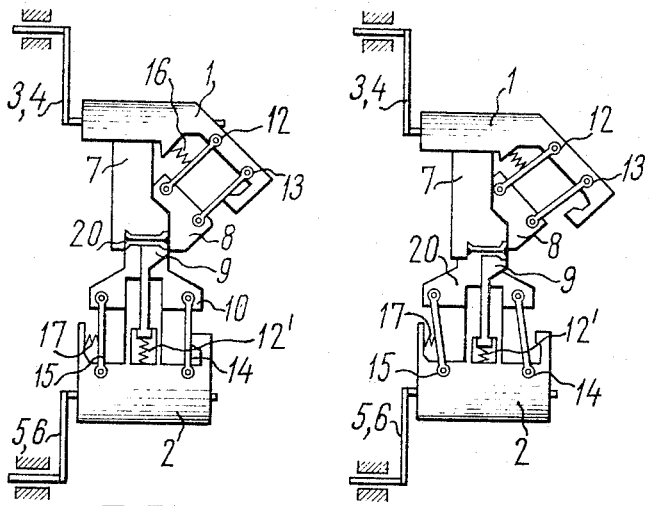

United States Patent Office 3,276,305
Patented Oct. 4, 1966

3,276,305
FLYING SHEARS FOR CUTTING ROLLED, BENT
AND SIMILAR ROLLED SHAPES
Alexei Stepanovich Burov, Boris Nikodimovich Ljamin, and Evgeny Alexandrovich Zhukevich-Stosha, all of Moscow, U.S.S.R., assignors to Vsesojuzny Nauchno-Issledovatelsky i Proektno-Konstruktorski Institute Metallurgicheskogo Mashinostroenija, Moscow, U.S.S.R.
Filed Nov. 19, 1964, Ser. No. 412,480
4 Claims. (Cl. 83—303)

This invention relates to flying and stationary shears employed for cutting shaped sections, particularly rolled structural shapes.

Existing shears for cutting rolled shapes cut the latter at an angle of 45 degrees with respect to the web of the section by means of one pair of blades, each of which is provided with a closed pass which is shaped to match the profile of the rolled shape to be cut.

Such shears are not employed on any large scale at steel works operating on the flow-production method, due to the fact that it is practically impossible to feed rolled shapes into the openings in the blades with small clearances when the shears are installed in the production line.

Also known are flying shears possessing a pair of blades, the cutting edges of which are shaped to match the profile of the rolled shape to be cut. The blades are driven in opposite directions, so as to meet each other and to embrace the rolled shape and to cut it in one direction.

A disadvantage of these shears is that they crush the rolled shapes at the shearing zone.

An object of this invention is to eliminate these disadvantages and to provide shears for cutting rolled shapes with high quality of cuts at a high speed of operation.

This object is attained by shears for cutting rolled shapes, in which the shear blades are located in blade supports travelling in opposite directions to meet each other; the cutting edges of said blades being shaped to match the profile of the rolled section to be cut. According to this invention, the blades are of composite design; and in one support carrying a group of blades, one of the said blades is stationary, while the other (the movable blade) is installed with the aid of a device adapted for moving said blade in a direction non-coincident with that of the travel of the blade support, preferably at an angle of 45 degrees with respect to the direction of travel of the said blade support; in the second blade support the group of blades is installed so that one blade is movably connected to the said blade support so that it can travel relative to and in the same direction as said blade support; the second blade is likewise connected movably to the said blade support by a device adapted for moving the said blade in a direction non-coincident with the direction of travel of the said second blade support.

The blade shifting devices of the said groups comprise at least one spring-loaded lever mounted on each blade support and connected to said movable blade thereof so as to enable it to travel in a plane parallel to the shearing plane; the said lever ensuring the movement of the said blade for effecting the shearing of the rolled stock and for its return to the initial position upon completion of the cut.

The movable blade of at least one blade support may be fitted directly on the said support through a shaft ensuring a swinging motion of the said blade around the said shaft during the shearing operation; the blade being spring-loaded for its return to its initial position on completion of the shearing stroke.

In addition, the movable blade of at least one blade support may be installed in guides located in the blade support, the said guides ensuring the movement of the blade in a direction not-coinciding with that of the blade support during the shearing stroke; the blade being spring-loaded for its return to its initial position on completion of the shearing stroke.

The appended drawings illustrate an embodiment of the invention, wherein:

FIG. 5 is a view along arrow A (FIG. 4) of the crank-mounted pushers and rollers for returning the blades to their initial position;

FIG. 7 is a schematic view of the shears during the cutting stroke;

FIG. 8 is a schematic view of the shears upon completion of the cutting stroke;

The shears comprise two blade supports 1 and 2 installed on cranks 3, 4 and 5, 6, respectively, said cranks transmitting a converging movement to the said blade supports.

Each of the said blade supports carries a group of blades, each group consisting of two blades 7, 8 and 9, 10, respectively, the cutting edges of which are shaped to match the profile of the rolled section to be cut.

In order to avoid using expensive steel, the blades may be composed of separate elements arranged on a holder.

Figure 1:
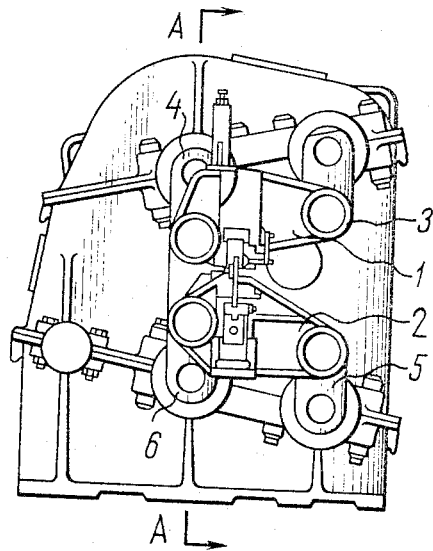
FIG. 1 is a front elevation of the shears.
Figure 3:
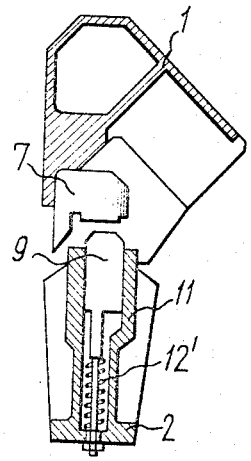
FIG. 3 is a longitudinal section of the blade supports with blades moving in the same direction as the blade supports.
Figure 2:
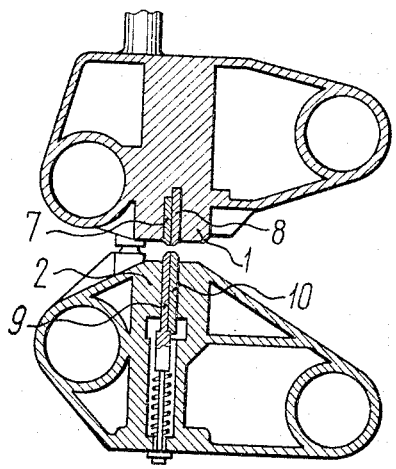
FIG. 2 is a cross section of the blade supports with blades.

Blades 7 and 9 of the blade groups travel in a direction coinciding with that of the travel of blade supports 1 and 2. Blade 7 is immovably attached to support 1 while blade 9 is installed in guides 11 of blade support 2 and is capable of traveling relative to the latter under the action of immovable blade 7. Blade 9 is returned to its initial position by spring 12′ (FIG. 3).

Figure 4:
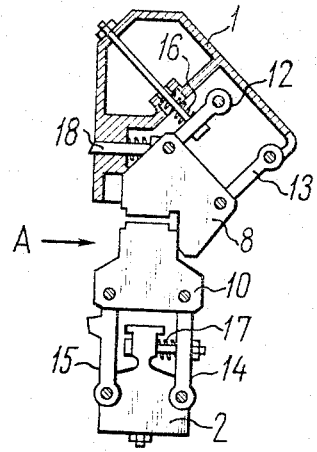
FIG. 4 is a longitudinal section of the blade supports with blades moving in a direction not coinciding with that of the blade supports.

Blades 8 and 10 of said blade groups are installed on blade supports 1 and 2, respectively, and are capable of travelling through levers 12, 13 and 14, 15 in a direction not coinciding with that of the travel of the said blade supports 1 and 2 (FIG. 4). Levers 12 and 14 are linked to springs 16 and 17 for returning blades 8 and 10 to the initial position on completion of the shearing stroke.

Should the blades become jammed at the end of the shearing stroke, they can be returned to their initial position by means of pushers 18 interacting with rollers 19 seated on cranks 3 and 4 (FIG. 5).

Figure 6:
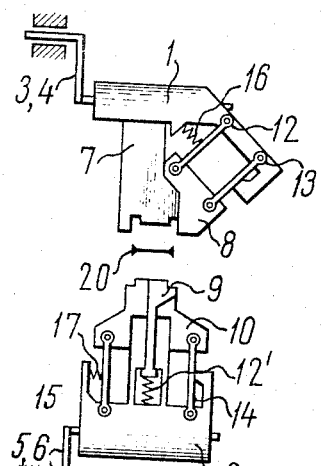
FIG. 6 is a schematic view of the shears in the position before the cutting stroke.

The shears function in the following manner:

In their initial position blade supports 1 and 2 are separated and levers 12 and 13 linking blade 8 to blade support 1 are set at an angle of 45 degrees with respect to the web of rolled section 20 to be cut, while levers 14 and 15 linking blade 10 to blade support 2 are set vertically with respect to said rolled section (FIG. 6).

At the commencement of the shearing stroke, supports 1 and 2 actuated by cranks 3, 4 and 5, 6 travel in opposite directions to meet each other; as a result, rolled section 20 to be cut is embraced by all the blades (FIG. 7).

As blade supports 1 and 2 continue their strokes, blade 9 is depressed by blade 7; blades 8 and 10 thrusting against rolled section 20 to be cut, are forced to travel in a direction not coinciding with that of the travel of blade supports 1 and 2, and cut the said rolled section simultaneously with blades 7 and 9.

Blade 8 moves chiefly at an angle of 45 degrees relative to the web of rolled section 20, while blade 10 travels horizontally (FIG. 8).

Figure 9:
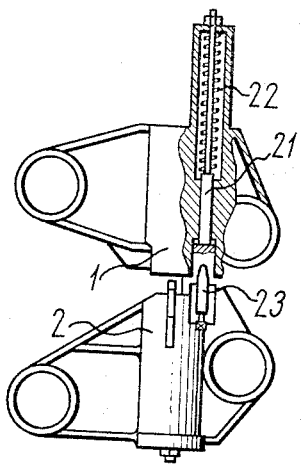
FIG. 9 shows the device for holding the blade support in position during the cutting stroke.

To obviate the effect of play on the clearance between the blades during the shearing stroke, blade support 1 is fitted with a rod 21 having a tapered bore and with a spring 22; blade support 2 is fitted with a tapered pin 23 installed so as to lock blade supports 1 and 2 on their approach (FIG. 9). During the shearing process, rod 21 travels and compresses spring 22; on completion of the shearing stroke, spring 22 returns the said rod to its initial position.

Figure 10:
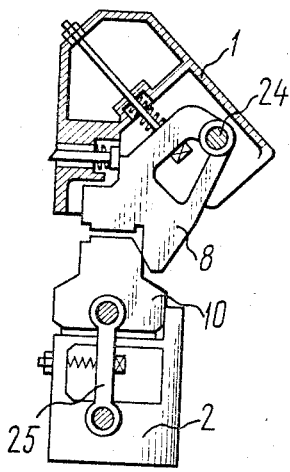
FIG. 10 shows a modification of the blade moving device.

FIG. 10 shows a modification of the arrangement of blade 8 fitted in blade support 1 wherein blade 8 is mounted on shaft 24 which ensures a swinging motion of blade 8 for cutting the rolled section. Blade 10 is linked to blade support 2 through a lever 25.

Figure 11:
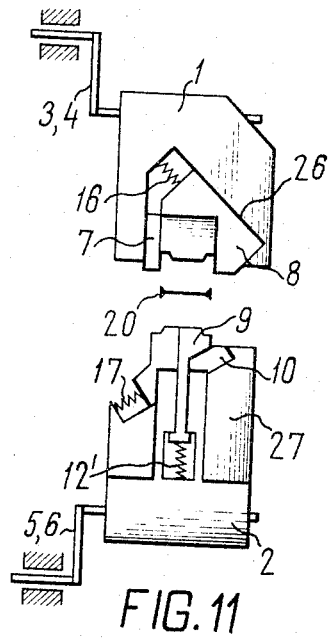
FIG. 11 shows another modification of the blade moving device.

FIG. 11 shows a modification of the arrangement of blades 8 and 10 which are installed in guides 26 and 27 of blade supports 1 and 2, and which ensure the travel of the said blades at a preset angle relative to the direction of travel of blade supports 1 and 2.

The shears according to the invention can be installed in rolling mill lines of plants operating on flow-production methods.

The invention may be also applied to stationary shears.

What we claim is:

1. A device for cutting rolled, bent and similar rolled shapes, comprising two blade supports; an arrangement for moving the said blade supports to meet each other; two groups of blades, each group being mounted on one of the said blade supports, the blades having cutting edges which are shaped to match the profile of the work to be cut; a first blade of one group of blades being secured in stationary manner on one of the said blade supports; a first blade of the second group of blades being installed in the second blade support for being capable of travelling relative to and in the same direction of travel of the said blade support; a device for moving the said first blade; second blades of each group of blades being installed in their respective blade supports for being and capable of travelling in a direction not-coinciding with the direction of travel of the said blade supports, for performing the shearing stroke jointly with the said first blades; a second device for moving a blade of each group of blades, and a device for returning the said second blade of each group to its initial position on completion of the shearing stroke.

2. A device for cutting rolled, bent and similar rolled shapes, comprising: two blade supports, a device for moving the said blade supports to meet each other; two groups of blades, each group being mounted in one of the said blade supports; the blades having cutting edges which are shaped to match the profile of the work to be cut; a first blade of one group of blades being secured in stationary manner in one of the said blade supports; a first blade of the second group of blades being installed in the second blade support for being capable of travelling relative to and in the same direction of travel as the said first blade; a device for moving the said blade; second blades of each group of blades being installed in their respective blade supports for being capable of travelling in a direction not-coinciding with the direction of travel of the said blade supports; at least one lever on each blade support and linked to each of the said second blades and moving the said second blade at a preset angle relative to the travel of the blade support for cutting the work jointly with the said first blades; a device for returning the said levers to their initial positions on completion of the cutting stroke; and a device for locking one blade support relative to the second blade support during the shearing stroke.

3. A device for cutting rolled, bent and similar rolled shapes, comprising: two blade supports; a device for moving the said blade supports to meet each other; two groups of blades, each group being mounted on one of the said blade supports; the blades having cutting edges which are shaped to match the profile of the work to be cut; one blade of one group of blades being secured in stationary manner on one of the said blade supports; one blade of the second group of blades being installed in the second blade support for being capable of travelling relative to and in the same direction of travel of the said blade support; a device for moving the said blade; second blades of each group of blades being installed on their respective blade supports for being capable of travelling in a direction not-coinciding with the direction of travel of the said blade supports; a shaft installed in at least one blade support, perpendicular to shearing plane; the said shaft carrying one of said second blades which is capable of a swinging motion for cutting the work jointly with the other said blades; a device for returning the said second swinging blade to its initial position on the completion of the cut, and a device for locking one blade support relative to the second blade support during the shearing stroke.

4. A device for cutting rolled, bent and similar rolled shapes, comprising: two blade supports; a device for moving the said blade supports to meet each other; two groups of blades each group being mounted in one of the said blade supports; the blades having cutting edges which are shaped to match the profile of the work to be cut; one blade of one group of blades being secured in stationary manner in one of the said blade supports; one blade of the second group of blades being installed in the second blade support for being capable of travelling relative to and in the same direction of travel as the said blade support; a device for moving the said blade; second blades of each group of blades being installed in their respective blade supports for being capable of travelling in a direction not-coinciding with the direction of travel of the blade supports; guides in at least one blade support, the said guides locating a respective second blade and ensuring the travel of the latter at a preset angle relative to the direction of travel of the said blade support for cutting the work jointly with the said other blades; a device for reutrning this blade to its initial position on completion of the shearing stroke; and a device for locking one blade support relative to the second blade support during the cutting stroke.

No references cited.

WILIAM S. LAWSON, *Primary Examiner.*
WILLIAM W. DYER, Jr., *Examiner.*
F. T. YOST, *Assistant Examiner.*